United States Patent
Chi

[11] Patent Number: 5,573,262
[45] Date of Patent: Nov. 12, 1996

[54] STEERING BEARING ASSEMBLY FOR A WHEELED VEHICLE

[76] Inventor: Yi Chen Chi, No. 139-5, An Mei Rd., Mei Shan Village, Hou Li Hsiang, Taichung Hsien, Taiwan

[21] Appl. No.: 291,679

[22] Filed: Aug. 16, 1994

[51] Int. Cl.$^6$ .................................................. B02K 21/06
[52] U.S. Cl. ........................ 280/279; 384/513; 384/540; 384/545
[58] Field of Search .................................. 280/276, 279, 280/280; 384/545, 544, 540, 517, 513, 541–543, 504, 490, 535, 536

[56] References Cited

U.S. PATENT DOCUMENTS

| | | | |
|---|---|---|---|
| 5,095,770 | 3/1992 | Rader, III | 280/279 X |
| 5,163,758 | 11/1992 | Chi | 384/545 X |
| 5,246,296 | 9/1993 | Chi | 280/279 X |

FOREIGN PATENT DOCUMENTS

| | | | |
|---|---|---|---|
| 541070A1 | 5/1993 | European Pat. Off. | 280/279 |
| 2612482A | 9/1988 | France | 280/279 |
| 12250 | of 1890 | United Kingdom | 280/279 |

*Primary Examiner*—Anne Marie Boehler
*Assistant Examiner*—Victor E. Johnson
*Attorney, Agent, or Firm*—Bacon & Thomas

[57] ABSTRACT

A steering bearing assembly for a wheeled vehicle, which includes a steerer tube rotatably passing through a head tube of the wheeled vehicle by disposing an upper and a lower steering bearing assemblies therebetween, the assembly has an upper race and a lower race and a plurality of balls rotatably received therebetween. A washer and an absorbing element are disposed between the upper race and the steerer tube. A force exerting element exerts a downward force on the washer to set the upper race in position.

2 Claims, 2 Drawing Sheets

STEERING BEARING ASSEMBLY FOR A WHEELED VEHICLE

BACKGROUND OF THE INVENTION

The present invention relates to a steering bearing assembly for a wheeled vehicle and more particularly, to a steering bearing assembly having an upper race which is securely engaged to a steerer tube by disposing a washer and an absorbing element therebetween.

A steering assembly for a bicycle with a nonexternally threaded steerer tube is disclosed in U.S. Pat. No. 5,095,770 entitled as "STEERING BEARING ASSEMBLY FOR WHEELED VEHICLE" (see FIG. 1), wherein the second race 59 thereof is positioned by disposing a compression ring 67 between the second race 59 and the connector 35, both the compression ring 67 and the second race 59 have a tapered contacting surface respectively such that the connector 35 exerts a downward force to the compression ring 67 to fix the second race 59 by producing a radial force via the tapered contacting surfaces.

However, to manufacture the second race and the compression ring each with a tapered contacting surface needs plural processes and, moreover, such an engagement between two tapered contacting surfaces tends to loosen when a bicycle is ridden over rugged roads.

The present invention intends to provide a steering bearing assembly in which all the components need not be manufactured with a tapered contacting surface so as to form a simplified structure and this mitigates and/or obviates the above-mentioned problems.

SUMMARY OF THE INVENTION

The present invention provides a steering bearing assembly for a wheeled vehicle, which includes a steerer tube rotatably passing through a head tube of the wheeled vehicle by disposing an upper and a lower steering bearing assemblies therebetween, the assembly includes an upper race and a lower race and a plurality of balls rotatably received therebetween. A washer and an absorbing element are disposed between the upper race and the steerer tube. A force exerting element exerts a downward force on the washer to set the upper race in position such that all the components of the present invention do not need to be manufactured by complicated processes.

It is an object of the present invention to provide a steering bearing assembly having a simple structure and a good feature in positioning the upper race thereof.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
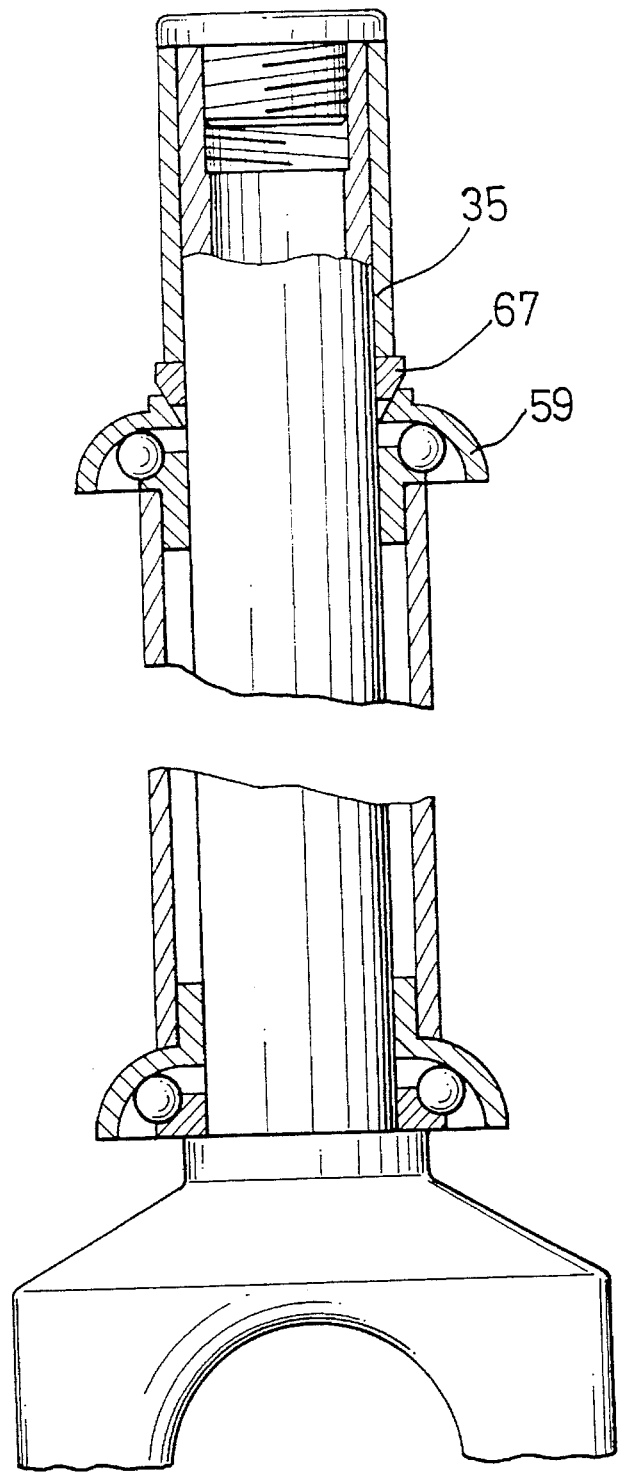
FIG. 1 is a front elevational view of a steering bearing assembly of U.S. Pat. No. 5,095,770.
Figure 2:
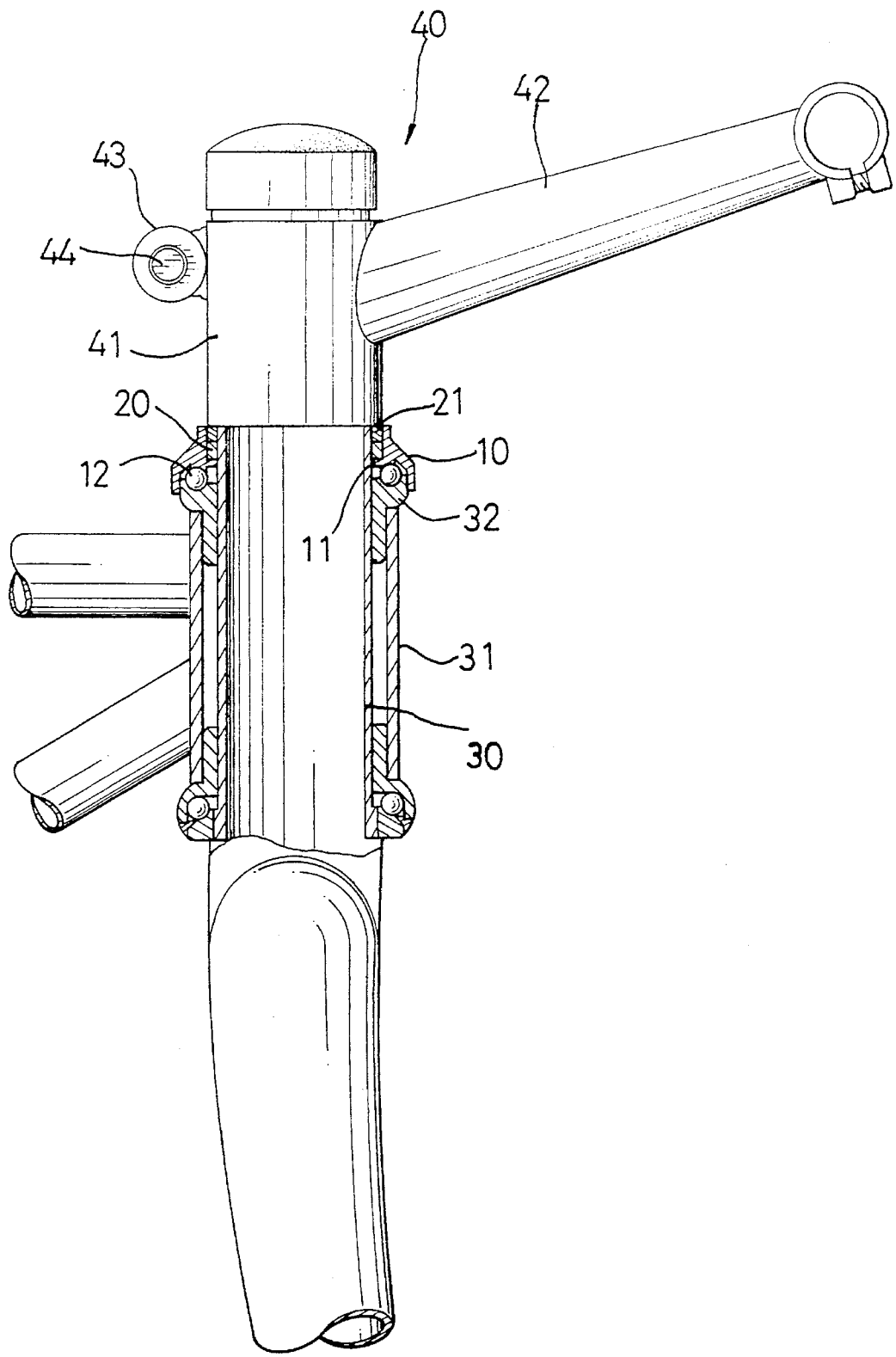
FIG. 2 is a side elevational view of a steering bearing assembly in accordance with the present invention.

Referring to FIG. 2, a wheeled vehicle such as a bicycle has a head tube 31 having first and second ends and a steerer tube 30 passes through the head tube 31 by disposing an upper steering bearing assembly to the first end thereof and a lower steering bearing assembly to the second end thereof such that the steerer tube 30 is rotatable within the head tube 31. A handlebar stem 40 has a vertical portion 41 and a substantially horizontal portion 42, the vertical portion 41 has a slit (figure not shown) and two lugs 43 extends transversely from the vertical portion 41 beside the slit such that the vertical portion can be securely mounted to the steerer tube 30 by threading a bolt 44 through the two lugs 43.

The upper steering bearing assembly includes an upper race 10 and a lower race 32 and a plurality of balls 12 rotatably received therebetween. There is a space defined between the upper race 10 and the steerer tube 30, a flange 11 extends radially toward the steerer tube 30 from a lower end of the upper race. An absorbing element 20 and a washer 21 are disposed in the space and are disposed on the flange 11, wherein the absorbing element 20 is made of resilient material. The vertical portion 41 of the handlebar stem performs as a force exerting element to exert a downward force to the washer 21 such that the washer 21 and the absorbing element 20 are compressed to fill in the space and the absorbing element 11 further produces a radial force acting to the upper race 10 and the steerer tube 30 to ensure the upper race 10 in a fixed position.

Accordingly, all the components of the present invention have simple configurations and need not to be manufactured by complicated processes.

Although the invention has been explained in relation to its preferred embodiment, it is to be understood that many other possible modifications and variations can be made without departing from the spirit and scope of the invention as hereinafter claimed.

I claim:

1. A steering bearing assembly for a wheeled vehicle, having a head tube, a steerer tube passing through said head tube with at least one bearing assembly therebetween, said beating assembly comprising:

an upper race and a lower race having a plurality of balls rotatably received therebetween said lower race connected to the head tube such that the steerer tube passes through said lower race, said upper race having an inner wall extending around and substantially parallel to the steerer tube and having a flange extending inwardly from the inner wall toward said steerer tube from a lower end thereof, the inner wall of the upper race spaced from the steerer tube so as to form a generally annular space therebetween with the flange forming a bottom of the space;

a resilient absorbing element extending around said steerer tube and located on the flange within said generally annular space between said steerer tube and said upper race; and, a force exerting element attached to said steerer tube and exerting a downward force on said resilient absorbing element to compress the resilient element against the upper race and the steerer tube so as to securely position said upper race on said steerer tube.

2. The steering bearing assembly as claimed in claim 1 wherein said bearing assembly further comprises a washer disposed in contact with said resilient absorbing element and said force exerting element.

* * * * *